(12) United States Patent
Ottaway (10) Patent No.: US 8,272,200 B1
(45) Date of Patent: Sep. 25, 2012

(54) METHOD AND APPARATUS FOR HARVESTING LETTUCE

(75) Inventor: James Ottaway, Meadow Vista, CA (US)

(73) Assignee: Versacore International, LLC, Carmel, CA (US)

( * ) Notice: Subject to any disclaimer, the term of this patent is extended or adjusted under 35 U.S.C. 154(b) by 190 days.

(21) Appl. No.: 12/792,188

(22) Filed: Jun. 2, 2010

Related U.S. Application Data (60) Provisional application No. 61/183,386, filed on Jun. 2, 2009.

(51) Int. Cl.
*A01D 45/00* (2006.01)
(52) U.S. Cl. ...................................... 56/327.1
(58) Field of Classification Search .......... 56/14.3–14.5, 56/16.6, 17.3, 121.4, 121.41, 121.42, 121.46, 56/233, 237, 327.1, 328.1, 335, DIG. 2, DIG. 8, 56/DIG. 20; 171/38, 61, 41
See application file for complete search history.

(56) References Cited

U.S. PATENT DOCUMENTS

| | | | | |
|---|---|---|---|---|
| 2,314,681 A | * | 3/1943 | Beatty | 56/121.42 |
| 3,126,062 A | * | 3/1964 | Schmidt | 171/42 |
| 3,485,023 A | * | 12/1969 | See | 56/327.1 |
| 3,497,013 A | * | 2/1970 | Baker | 171/38 |
| 3,690,049 A | * | 9/1972 | Roberson et al. | 56/13.9 |
| 3,739,854 A | * | 6/1973 | Janssen | 171/61 |
| 3,800,518 A | * | 4/1974 | Baggiolini et al. | 56/327.1 |
| 3,827,503 A | * | 8/1974 | Hansen | 171/38 |
| 4,185,696 A | * | 1/1980 | Williams et al. | 171/38 |
| 4,687,064 A | * | 8/1987 | Johnson | 171/27 |
| 5,560,190 A | | 10/1996 | Ottaway | |
| 6,036,989 A | * | 3/2000 | Ellis | 426/484 |
| 6,282,877 B1 | * | 9/2001 | Yoder | 56/327.1 |
| 6,378,281 B1 | | 4/2002 | Ottaway | |
| 6,622,467 B1 | | 9/2003 | Ottaway | |
| 7,395,653 B2 | * | 7/2008 | de Groot et al. | 56/327.1 |

FOREIGN PATENT DOCUMENTS

EP 1621062 * 1/2006

OTHER PUBLICATIONS

Literal translation of EP 1621062 using Google Translator, http://translate.google.com/#delenl.*

* cited by examiner

*Primary Examiner* — Thomas B Will
*Assistant Examiner* — Mai Nguyen
(74) *Attorney, Agent, or Firm* — Garvey, Smith, Nehrbass & North, L.L.C.; Charles C. Garvey, Jr.; Vanessa M. D'Souza

(57) ABSTRACT

A method and apparatus for harvesting lettuce provides one or more harvesting heads that move between harvesting and discharge positions of the harvester. Each harvesting head separates a head of lettuce from its stem and core. Each harvesting head has specially configured fingers that secure the head during harvesting. The fingers move between open and closed positions.

9 Claims, 9 Drawing Sheets

METHOD AND APPARATUS FOR HARVESTING LETTUCE

CROSS-REFERENCE TO RELATED APPLICATIONS

Priority of U.S. Provisional Patent Application Ser. No. 61/183,386, filed 2 Jun. 2009, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to the harvesting of lettuce heads from a row of lettuce or like agricultural environment. More particularly, the present invention relates to an improved lettuce harvester that employs a specially configured harvesting module that cuts, cradles, and then lifts each head of lettuce. In one embodiment, a de-leafing member or ring pushes the outer lettuce leaves downwardly and away from the inner lettuce leaves.

2. General Background of the Invention

Patents have issued that are directed to lettuce harvesting methods and apparatus. Examples can be found in the following table, each patent listed in the table is hereby incorporated herein by reference.

TABLE

| PATENT NO. | TITLE | ISSUE DATE MM-DD-YYY |
|---|---|---|
| 5,560,190 | Lettuce Harvesting Method and Apparatus to Perform the Same | 10-01-1996 |
| 6,378,281 | Method and Apparatus for Harvesting Lettuce | 04-30-2002 |
| 6,622,467 | Method for Harvesting Lettuce | 09-23-2003 |

BRIEF SUMMARY OF THE INVENTION

The present invention provides an improved method and apparatus for harvesting lettuce that employs a specially configured harvester module having a cutting portion that moves between open and closed positions. Each harvesting module has a plurality of arms (or in one embodiment fingers) that move between an open position and a closed position. The arms (or fingers) carry the cutting portion. In the closed position, the arms and cutting portions cut the stem and sever the head of lettuce to be harvested from its root system.

The preferred embodiment employs one or more fluid (e.g., pneumatic or hydraulic) driven actuators that move to control a plurality of arms, the arms moving between inner and outer positions.

The present invention provides a lettuce harvester that employs a harvester vehicle having a harvester chassis. The harvester chassis carries one or more harvesting modules.

In one embodiment, a manual mechanical lettuce head locator such as a pressure sensor can be used to contact or run up against a head of lettuce. When the pressure exceeds a certain level it actuates the harvesting module to move in a downward direction. Such a manual mechanical head locator could provide data to a computer regarding location of a head of lettuce to be harvested. That data could be used by the computer to lower the harvesting module and cut the stem. This manual locator could have a powered roller that spins forward, rotating in sync with the harvester. This forward spinning allows the locator roller to pass over the lettuce head without bumping or bruising the lettuce head.

The harvesting module is open while facing downwardly like a downward facing flower. A pusher, which can be in the form of a ring member, pushes the outer lettuce leaves down thus exposing the head of lettuce to be harvested. Once so depressed downwardly, the outer leaves surround the head and thus act as a barrier against the underlying soil for the module. The pusher or ring bottoms against the soil mass in which the lettuce grows, indexing the cutting portions in a proper position relative to the stem to be cut.

Fluid cylinders close the fingers around the head to sever the stem before the harvesting module moves the severed lettuce head upwardly.

In one embodiment, the present invention provides a "core-in" design arrangement that employs a harvesting portion with arms or fingers which may be sharpened at the tips so that the fingers collapse around the lettuce stem immediately under the head ball and cut it off. These sharpened arms or fingers can be sharp carbide removable tips.

In one embodiment, the fingers surround the lettuce head at ground level then move upwardly until they contact the lower extremities of the lettuce head ball. At this point, the fingers collapse inwardly and the blade tips cut the stem, thus separating the head from the stem. The fingers then gently lift the head up and place it in a selected locale such as on a transfer conveyor.

The apparatus of the present invention can work in conjunction with a computerized machine vision device that has in its memory a wide variety of digitized photos of the top of a head of lettuce. When this scanning devices matches a form to a head on the ground it identifies the center of its location and passes this information on to the harvester computer which adjusts its target to that of the machine vision unit, then proceeds with the harvest process steps.

The rotating structure of a preferred embodiment or any of the embodiments may be an option to both core-out (i.e., wherein the cutting portions do not sever the stem) and core-in methods and apparatus.

In one embodiment, a multiple fingered harvesting head can employ sharpened arms or fingers on each of several fingers that operate on multiple planes. When the module or open cage assembly drops down around a head of lettuce, the arms or fingers close and the head stem is severed just below the last row of leaf spines. The cage captures the harvested head then elevates to a place of collection (e.g., conveyor). A pusher which can be a ground contacting ring contacts the ground and keeps the multiple fingered head from moving any further down, thus providing an accurate and repeatable stem cut position above the ground and below the head.

In another embodiment, a two arm or two fingered harvesting head can be provided, operating in one plane. One arm or finger can be blunt and referred to as a bumper. The other arm or finger is sharp and referred to as a blade. Alternatively, both fingers or arms can provide sharped ends or blades. The entire module can have an operator adjustable ground contacting ring that contacts the ground and keeps the fingers from moving any further down, thus providing an accurate and repeatable stem cut position above the ground and below the head.

In another embodiment, two flat curved plates are hidden beneath several flat rings. One plate has a sharpened edge and the other has a dull blunt edge. When the ring assembly drops down over and surrounding a head of lettuce, the bottom ring compresses leaves surrounding the head and provides the entire harvesting module with a ground reference point. The dull edged plate or bumper rotates in a counter clockwise direction, then stops upon contact with the lettuce stem. The sharp edged curved plate or blade rotates in a clockwise direction until it has completely severed the lettuce stem being held in position by the bumper. The blade continues traveling in a rotary path until it stops at a present mechanical position. The blade and bumper plates remain in the extended position giving the lettuce head a platform on which to be retained until the plates open and the head is dropped at the place of collection (e.g., conveyor belt).

In the drop down position, the lower end of the module or assembly pushes the outer leaves downwardly and then both outer leaves and the assembly in combination make contact with the ground. This action serves to push the surrounding outer leaves down away from the lettuce head to form a sanitary cutting environment for severing the stem. The pushed down outer leaves are flat against the ground and the pushing portion of the module is pressing them down. The assembly or module captures a head and moves to an elevated position to a place of collection.

In addition to this harvesting device is an attachment of a series of plates attached to a top ring and extending up in such a way as to prevent the harvested head from rolling off of the cutter prior to being dropped at the place of collection. This series of plates somewhat resembles a daily flower with petals open. Such plates aid in suppressing surrounding leaves of the harvested head in position.

The blades or fingers can sever the stem of the head in such a way as to orient the cut head. Because the cutter and bumper devices target and sever the stem and then hold the harvested head in a cage, the head can be manipulated to trim the core or remove the core or assist further packaging and processing of the harvested head.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
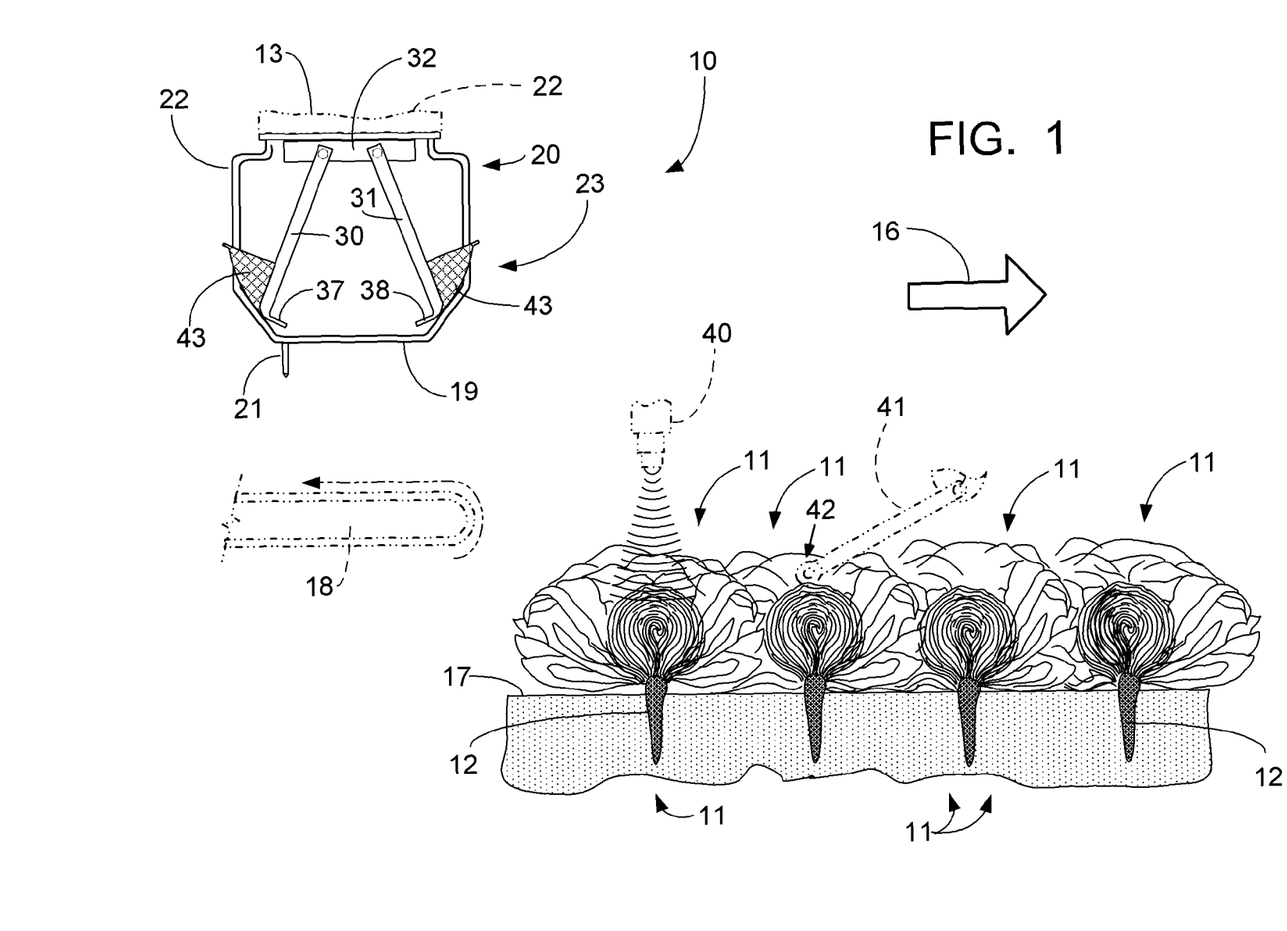
FIG. 1 is a schematic diagram of a preferred embodiment of the apparatus of the present invention and illustrating the method of the present invention.

FIGS. 1-12 show a preferred embodiment of the apparatus of the present invention designated generally by the numeral 10. Lettuce harvester 10 is shown in FIG. 1 traveling along the earth's surface 17. A plurality of heads of lettuce 11 are shown as planted, comprising one or more rows of lettuce. Each head of lettuce 11 has a stem 12 and a root system. The harvester 10 can be pulled with a tractor or other harvesting vehicle 13 which typically employs a chassis 14 and multiple wheels 15. Arrow 16 in FIGS. 1-5 indicates the direction of travel of the harvesting vehicle 13. Harvesting vehicle 13 supports one or more modules 20. The module 20 can be mounted on a tractor as an implement or alternatively the module can be supported upon its own self powered chassis. The harvester 10 employs a harvester module 20. Harvester module 20 is provided with a lower end portion having a pusher or ring 19 (see FIGS. 1-6 and 11-12). Pusher or ring 19 can be provided with one or more soil engaging spikes or anchors 21. Module 20 has a frame or body 22 that includes support 32. The support 32 has arms 30-31 pivotally attached thereto at pivots 33, 34. Arms 30-31 can be rotated about these pivots between an open position (see FIGS. 1, 2, 5, 7, 8, 12) and a closed or cutting position (see FIGS. 3, 4, 6, 9, 10, 11). Fluid driven actuators (e.g., pneumatic or hydraulic) 27, 28 can be used to move arms 30, 31 to an open or a closed position. In the drawings, the reference numeral 23 designates the open position while the reference numeral 24 designates the closed position. There can be two arms 30 (i.e., front and rear) and two arms 31 (i.e., front and rear). One pair of arms 30 carries a blunt member, anvil or bumper 37 spanning generally horizontally from the front arm 30 to the rear arm 30 (see FIG. 6). The other pair of arms 31 carries a sharpened tip portion or blade 38.

FIG. 1 shows an initial position of harvester 10 and an initial step of the method of the present invention. In FIG. 1, the harvesting vehicle locates the lettuce head in a proper position to harvest a head of lettuce 11. This positioning can be visually perfected using an operator or mechanically perfected using a sensor or camera 40 or a manual mechanical head locator 41 which could be pivotally attached to the chassis 14 of the harvesting vehicle 13. The manual mechanical head locator 41 could be a pressure sensor, used to contact or run up against a head of lettuce. When the pressure exceeds a certain level it actuates the harvesting module to move in a downward direction. Such a manual mechanical head locator 41 could provide data to an on board controller or computer regarding location of a head of lettuce 11 to be harvested. That data could be used by the computer to lower the harvesting module 20 and cut the stem. This manual locator could have a powered roller 42 that spins forward, rotating in sync with the harvester. This forward spinning allows the locator roller 42 to pass over the lettuce head without bumping or bruising the head of lettuce 11.

The apparatus 10 of the present invention could work in conjunction with a computerized machine vision device. The computer uses the head locator device to know when a head of lettuce enters the camera's field of view. This mechanism filters out most of the unwanted noise when searching for lettuce heads and it reduces the computational load off the computer when it is unnecessary for it to be searching. The computer uses an encoder device to measure the correct linear distance between the head locator and the machine vision field of view. Once a head of lettuce enters the field of view, the machine vision system uses algorithms based on edge detection and color to identify the exact position of the lettuce head. The computer digests the data from the locator, encoder and camera, then gives alignment instructions to the (X axis) control device on the harvesting monitor which then positions the monitor directly over the center of the head of lettuce. When all algorithmic conditions have been met, the computer gives the electrical signal for the harvesting monitor to drop down through a Z axis plane centered on the head.

Figure 2:
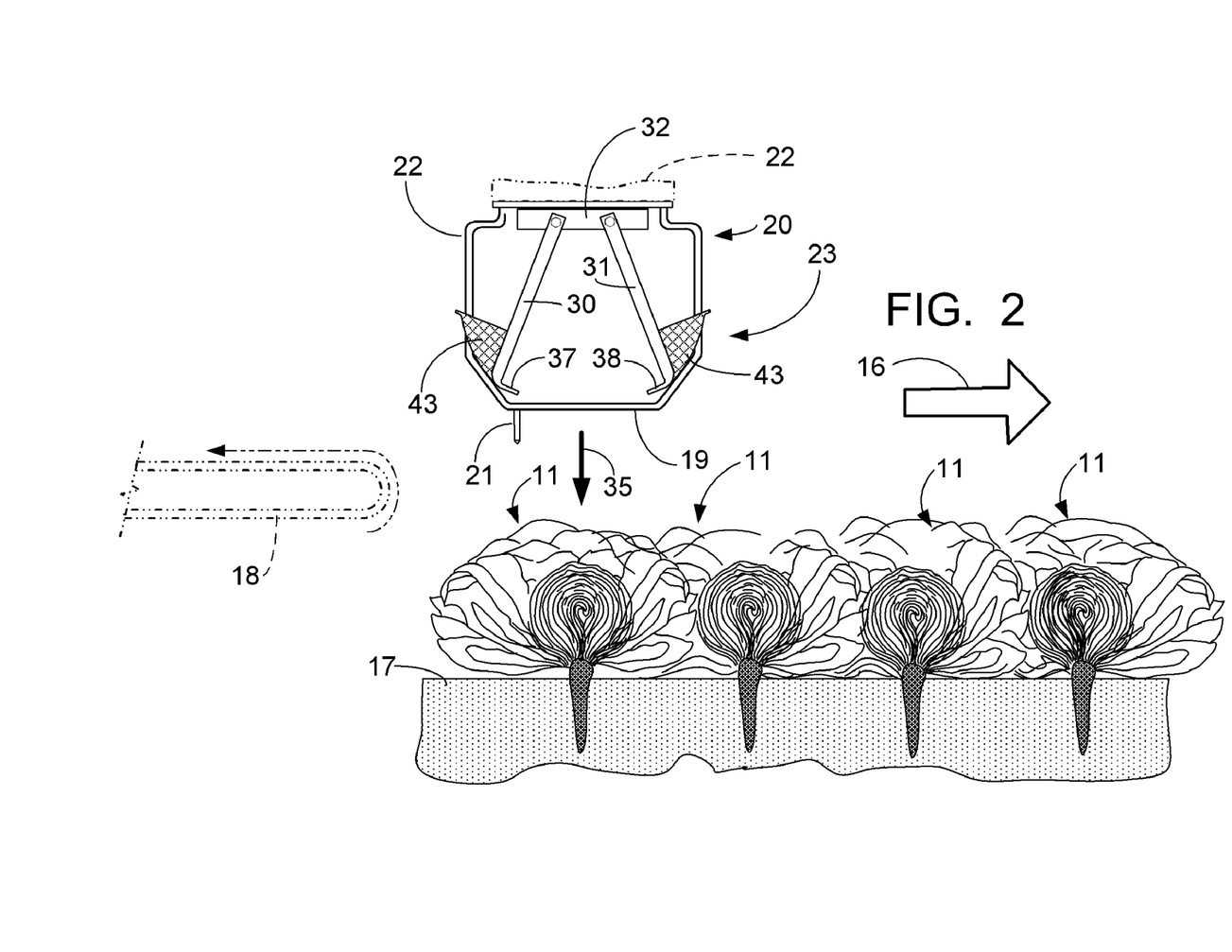
FIG. 2 is a perspective view of a preferred embodiment of the apparatus of the present invention showing the arms in an open position, and spaced above a head of lettuce to be harvested.
Figures 7, 9, 11, 12:
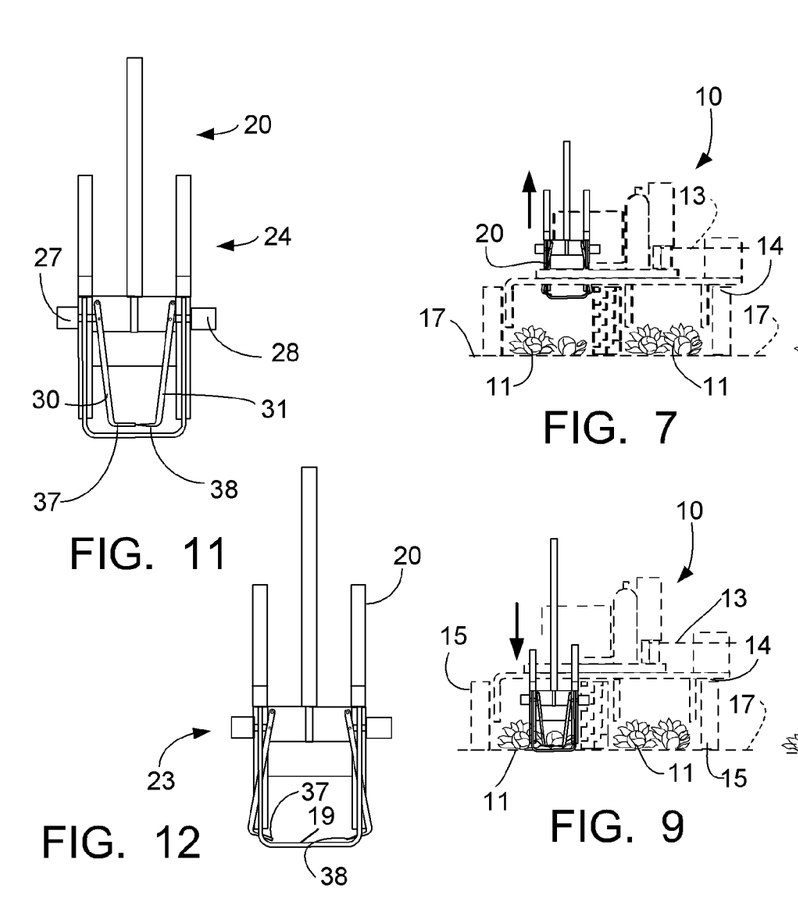
FIG. 7 is a schematic diagram of a preferred embodiment of the apparatus of the present invention.
FIG. 9 is a schematic diagram of a preferred embodiment of the apparatus of the present invention.
FIG. 11 is a fragmentary perspective view of the apparatus of the present invention showing a harvesting module.
FIG. 12 is a fragmentary perspective view of the apparatus of the present invention showing a harvesting module.
Figure 8:
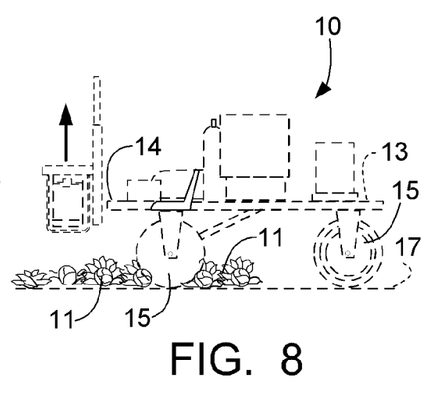
FIG. 8 is a schematic diagram of a preferred embodiment of the apparatus of the present invention.
Figure 10:
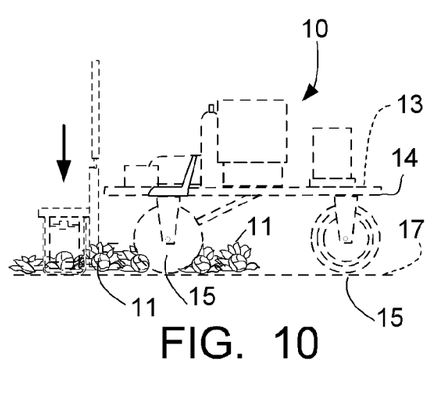
FIG. 10 is a schematic diagram of a preferred embodiment of the apparatus of the present invention.

FIGS. 2, 7, and 8 shows the properly positioned module 20 centered vertically over lettuce head 11. Arrow illustrates a lowering of the module 20 once it is properly positioned over a head of lettuce 11 to be harvested.

Figure 3:
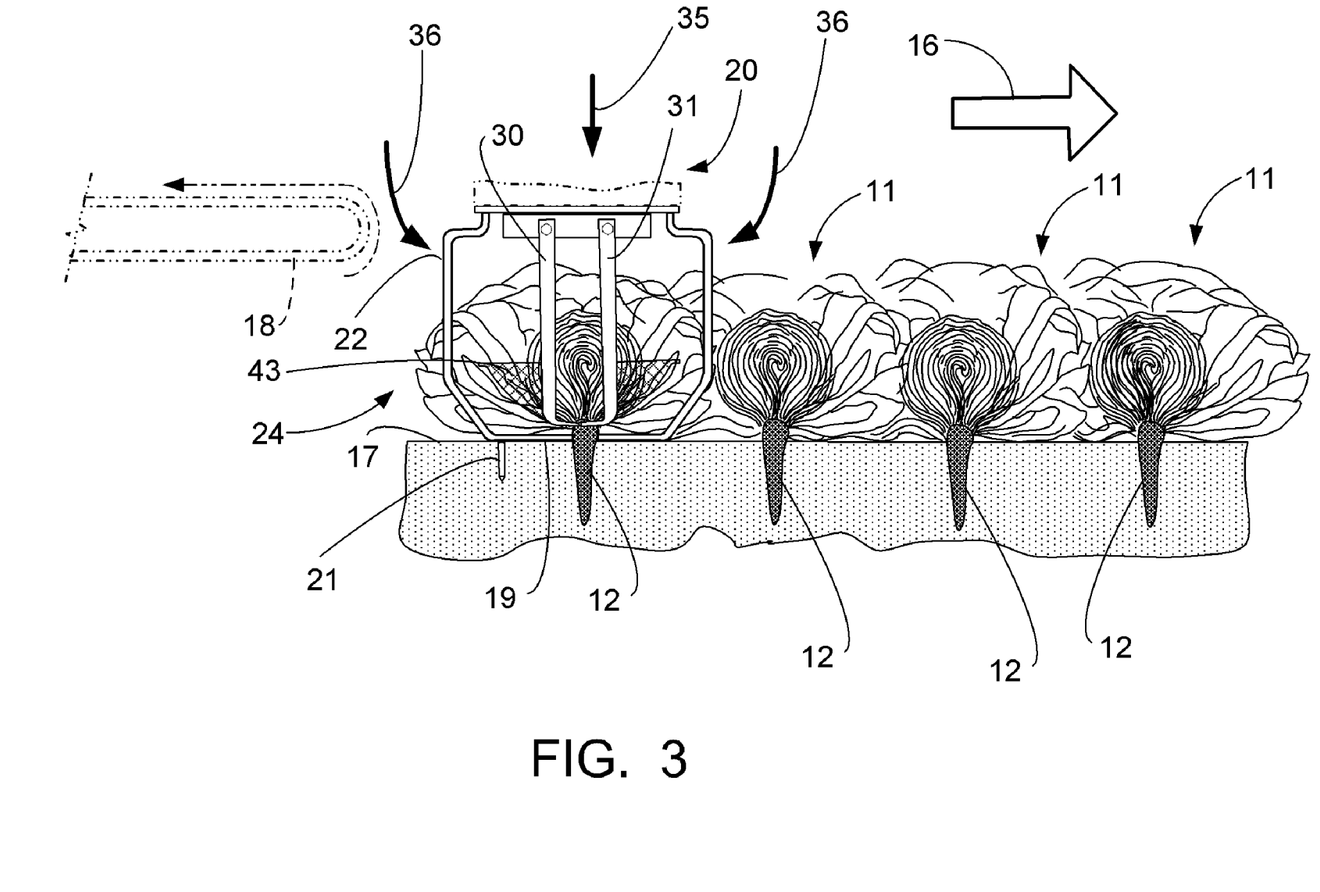
FIG. 3 is a perspective view of a preferred embodiment of the apparatus of the present invention illustrating the arms in a closed position wherein they cradle a head of lettuce to be harvested.
Figure 4:
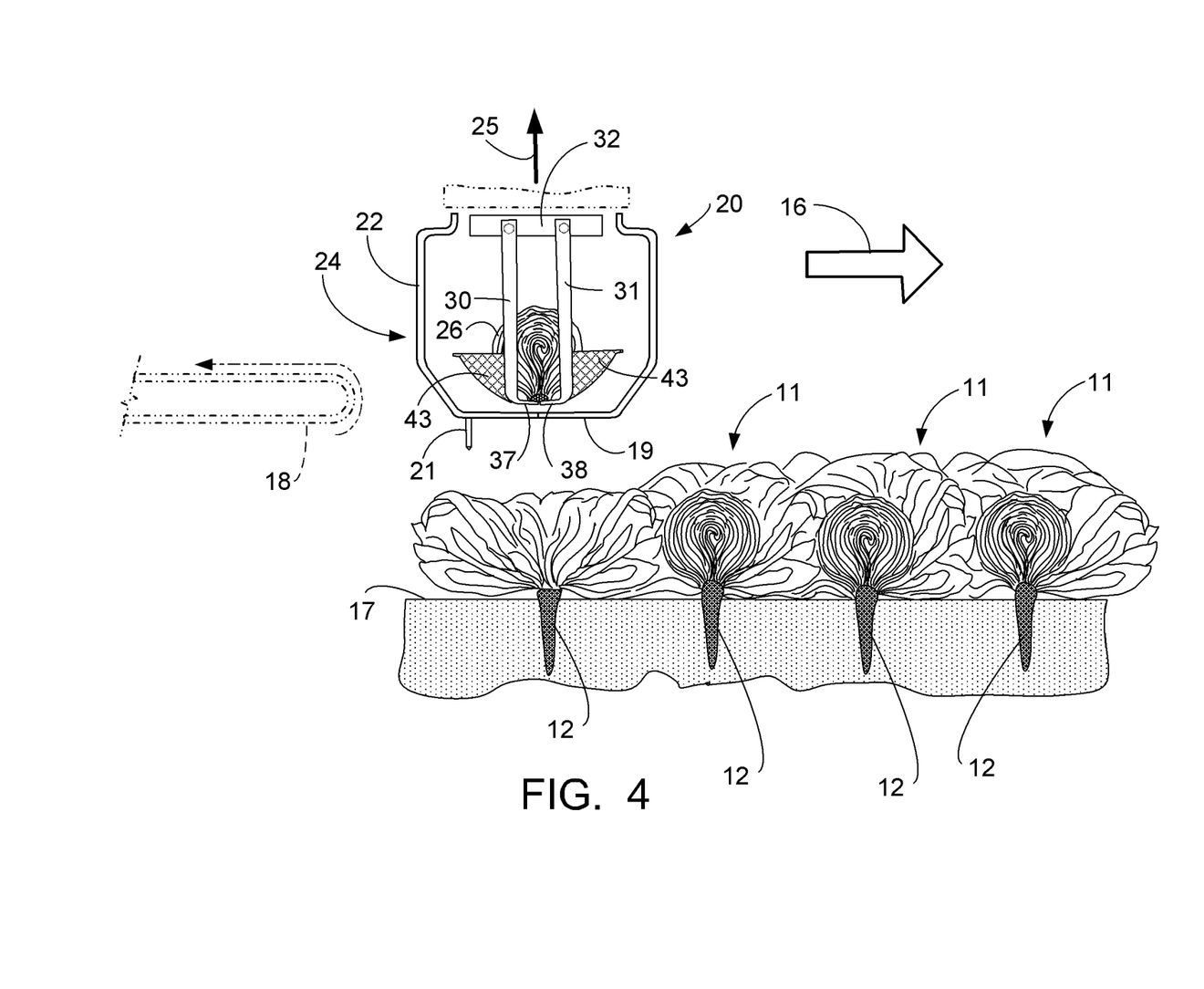
FIG. 4 is an elevation view of a preferred embodiment of the apparatus of the present invention illustrating lifting of a module and harvested lettuce head.
Figure 5:
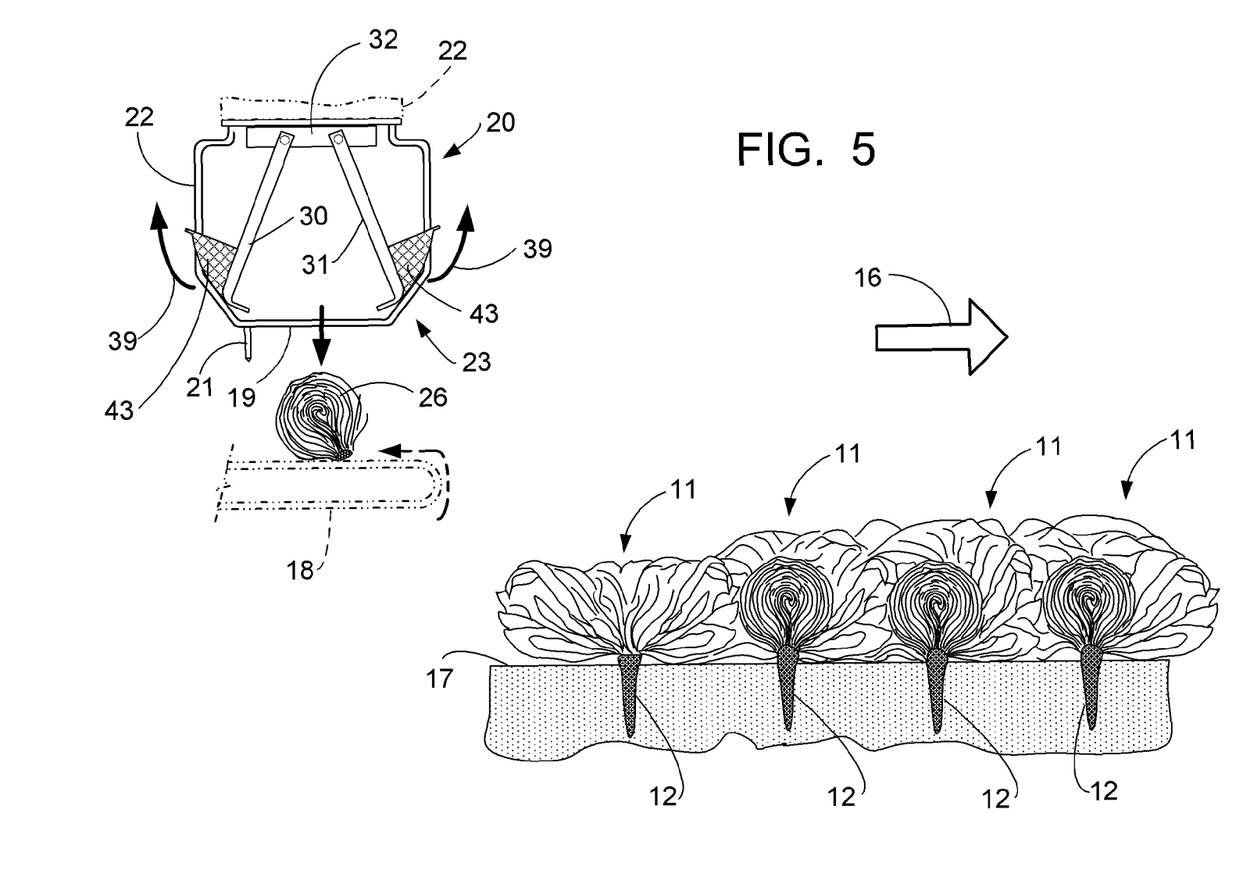
FIG. 5 is an elevation view of a preferred embodiment of the apparatus of the present invention, showing a transfer of a harvested lettuce head to a conveyor.

In FIG. 3, the module 20 has been lowered so that pusher or ring 19 has depressed the outer leaves of the head of lettuce 11 against the soil mass 17. The arms 30, have been rotated to a cutting position 24 as illustrated by arrows 36 in FIG. 3. This cutting position 24 can also be seen in FIGS. 6, 9, 10 and 11. As each head of lettuce 11 is harvested, the central or harvested portion 26 is lifted upwardly and can be moved laterally to a position that is indicated by arrow 25 in FIG. 4. The head of lettuce 11 is then deposited into or on a suitable receptacle such as a takeoff conveyor 18 (see FIG. 5) as indicated by the opening of arms 30, 31 (see arrows 39 in FIG. 5.

Harvesting modules 20 move between elevated and lowered (FIG. 3) positions. A sprayer (not shown) can be positioned to spray an aqueous solution on the harvested head after removal of the central portion 26 of the head of lettuce 11 after the head 11 has been picked. Such a spray provides a wipe or blotting function for the core in lettuce which helps keep the butt core from turning brown and hence extends shelf life.

Figure 6:
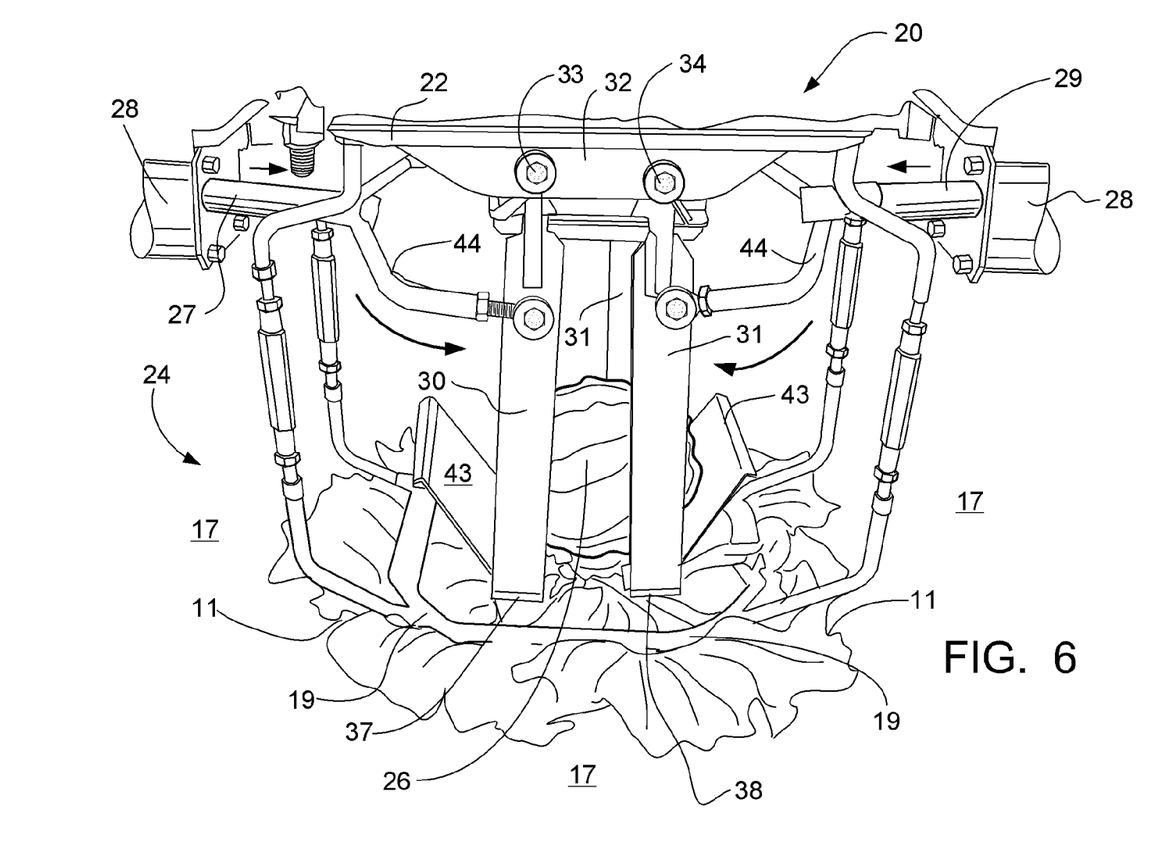
FIG. 6 is a fragmentary perspective view of the apparatus of the present invention showing a harvesting module.

Harvesting head 20 is shown in FIG. 6. Each harvesting head 20 employs a plurality of arms 30, 31 that are opened and closed using an actuator or pneumatic cylinder 27, 28. Suitable linkage opens (FIGS. 1, 2, 5) and closes (FIGS. 3, 4) the arms 30, 31 as the actuators 27, 28 are operated. The cylinders/actuators 27, 28 can each employ an actuator rod 29. Each rod 29 attaches to a pair of arms 30 or 31 using a yoke or pushrod(s) or other linkage 44 (see FIG. 6).

Frame 22 can include a support 32. Each arm 30, 31 is pivotally attached to support 32. Arms 30 pivotally attach to support 32 at pivots 33. Arms 31 pivotally attach to support 32 at pivots 34. One or more plates or basket sections 43 can be attached to arms 30, 31 for cradling a harvested or central portion 26 of a head of lettuce 11 after it has been cut (see FIGS. 3-4).

Figure 13:
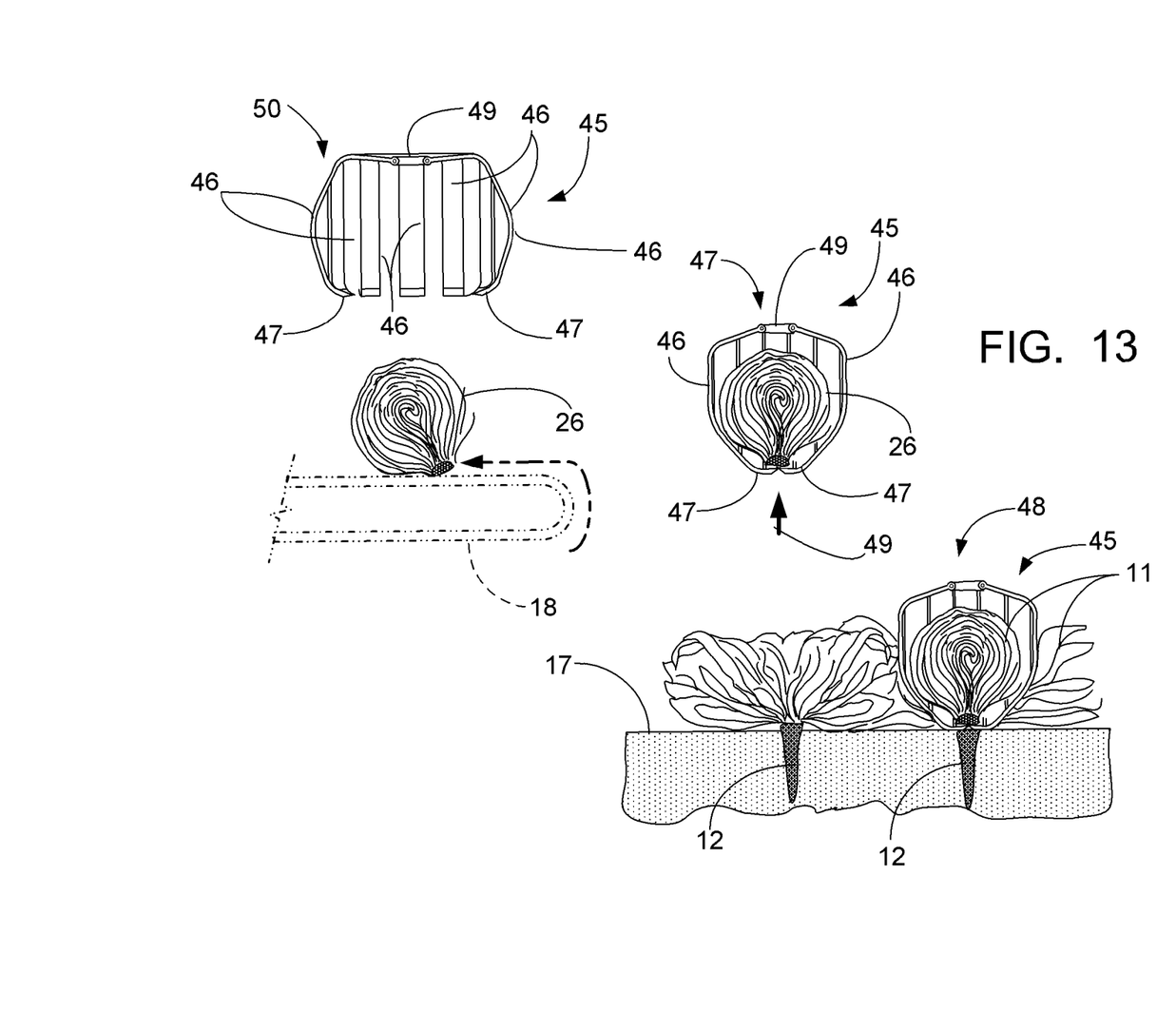
FIG. 13 is a schematic diagram of an alternate embodiment of the apparatus of the present invention.
Figure 14:
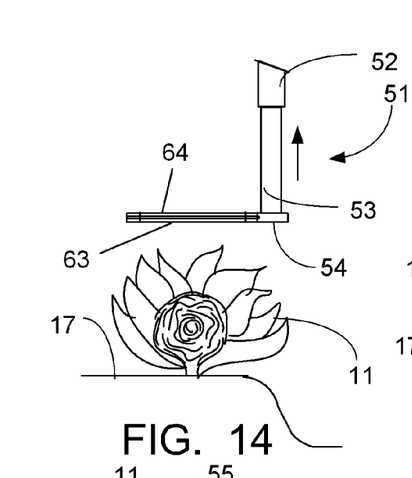
FIG. 14 is an elevation view of another alternate embodiment of the apparatus of the present invention.
Figure 15:
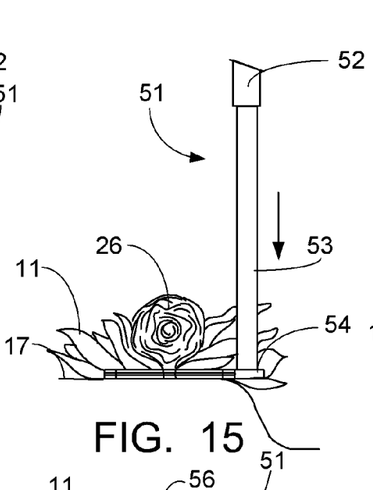
FIG. 15 is an elevation view of another alternate embodiment of the apparatus of the present invention.
Figure 16:
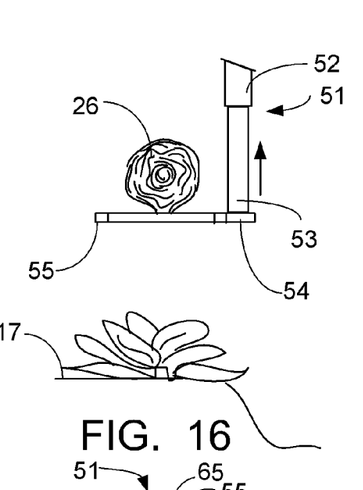
FIG. 16 is an elevation view of another alternate embodiment of the apparatus of the present invention.
Figures 17, 18:
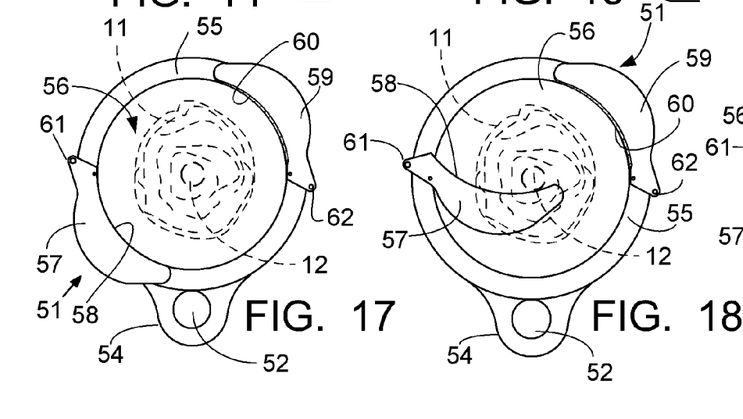
FIG. 17 is an elevation view of another alternate embodiment of the apparatus of the present invention.
FIG. 18 is an elevation view of another alternate embodiment of the apparatus of the present invention.
Figure 19:
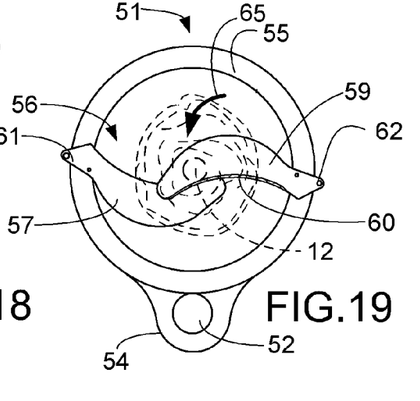
FIG. 19 is an elevation view of another alternate embodiment of the apparatus of the present invention.

FIG. 13 shows an alternate embodiment of the apparatus of the present invention which could be used with harvesting vehicle 13, but employing the harvesting head designated generally by the numeral 45. In the embodiment of FIG. 13, each harvesting head 45 has multiple fingers 46, each with a sharpened tip cutting portion 47. In the embodiment of FIG. 13, the multiple fingered harvesting head 45 can employ sharpened tips 47 on each of several fingers 46 that operate on multiple planes. The harvesting head 45 has a support 49. When the module 45 in an open cage assembly position 50 drops down around a head of lettuce 11, the fingers 46 close and the head 11 and the stem 12 is severed just below the last row of leaf spines. This module 45 in the form of a cage made up of the multiple fingers 46 captures the harvested head 26 (FIG. 13, position 48) then elevates to a place of collection (e.g., conveyor 18). A pusher which can be a ground contacting ring contacts the ground and keeps the multiple fingered head 45 from moving any further down, thus providing an accurate and repeatable stem cut position above the ground and below the head.

FIGS. 14-19 show yet another embodiment of the apparatus of the present invention wherein harvesting head 51 can be used with harvesting vehicle 13, the vehicle 13 supporting a frame 54 with a telescoping support member 52 having an extendible portion 53 which is movable between elevated (FIGS. 14, 16, 17, 19) and lowered (FIGS. 15, 18) positions. In the embodiment of FIGS. 14-19, two flat curved and rotating plates 57, 59 are hidden beneath a ring assembly 55 comprised of multiple flat rings 63, 64. One plate 59 has a sharpened edge 60 and rotates upon pivot 62. The other plate 57 has a dull blunt edge 58 and rotated upon pivot 61.

When the ring assembly 55 drops down over and surrounding a head of lettuce 11 through the opening 56, a bottom ring 63 compresses leaves surrounding the head 11 and provides the entire harvesting module 51 with a ground reference point. The dull edged plate or bumper 57 rotates in a counter clockwise direction (see arrow 65, FIG. 19), then stops upon contact with the lettuce stem 12. The sharp edged curved plate or blade 59 rotates in a clockwise direction until it has completely severed the lettuce stem 12 being held in position by the bumper 57. The blade 59 continues traveling in a rotary path until it stops at a present mechanical position. The blade 59 and bumper 57 plates remain in the extended position giving the harvested lettuce head 26 a platform on which to be retained until the plates 57, 59 open and the harvested head 26 is dropped at the place of collection (e.g., conveyor belt).

In the drop down position, the lower end of the module or assembly pushes the outer leaves downwardly and then both outer leaves and the assembly in combination make contact with the ground. This action serves to push the surrounding outer leaves down away from the lettuce head to form a sanitary cutting environment for severing the stem. The pushed down outer leaves are flat against the ground and the pushing portion of the module is pressing them down. The assembly or module captures a head and moves to an elevated position to a place of collection.

In addition to this harvesting device is an attachment of a series of plates attached to a top ring and extending up in such a way as to prevent the harvested head from rolling off of the cutter prior to being dropped at the place of collection. This series of plates somewhat resembles a daily flower with petals open. Such plates aid in suppressing surrounding leaves of the harvested head in position.

The following is a list of parts and materials suitable for use in the present invention.

| PARTS LIST | |
|---|---|
| Part Number | Description |
| 10 | lettuce harvester |
| 11 | head of lettuce |
| 12 | stem |
| 13 | harvesting vehicle |
| 14 | chassis |
| 15 | wheel |
| 16 | arrow |
| 17 | earth's surface/soil mass |
| 18 | takeoff conveyor |
| 19 | pusher/ring |
| 20 | harvesting module |
| 21 | spike/anchor |
| 22 | module frame |
| 23 | harvesting head open position |
| 24 | harvesting head closed position |
| 25 | arrow |
| 26 | central portion of lettuce head |
| 27 | pneumatic cylinder/actuator |
| 28 | pneumatic cylinder/actuator |
| 29 | rod |
| 30 | arm |
| 31 | arm |
| 32 | support |
| 33 | pivot |
| 34 | pivot |
| 35 | arrow |
| 36 | arrow |
| 37 | bumper/anvil |
| 38 | blade/cutter |
| 39 | arrow |
| 40 | sensor/camera |
| 41 | manual mechanical head locator |
| 42 | powered roller |
| 43 | plate/basket section |
| 44 | pushrod(s)/yoke/linkage |
| 45 | harvesting module |
| 46 | finger |
| 47 | cutting tip |
| 48 | closed or cutting position |
| 49 | support |
| 50 | open position |
| 51 | harvesting module |
| 52 | telescoping support |
| 53 | extendable section |
| 54 | frame |
| 55 | ring |
| 56 | opening |
| 57 | rotating member/flat curved plate |
| 58 | blunt surface |
| 59 | rotating member/flat curved plate |
| 60 | sharpened edge |
| 61 | pivot |
| 62 | pivot |
| 63 | ring |
| 64 | ring |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A lettuce harvester for harvesting one or more spaced apart rows of lettuce heads, comprising:
 a) a harvester chassis that can travel along the rows of lettuce;
 b) one or more harvester modules that are supported upon the chassis, each module having a blade movably supported for movement between an open and a closed cutting position;
 c) the module having a lower end portion with a de-leafing member that pushes outer lettuce leaves away from the lettuce head;
 d) a powered linkage for moving the blade;
 e) the linkage including an actuator that moves the blade between the open and closed positions;
 f) wherein the blade is positioned to extend under a head of lettuce to be harvested when in the closed position; and
 g) wherein an actuator lifts the blade and a head of lettuce while in the closed position;
 h) wherein the actuator includes a sliding member and links that join the blade to the sliding member;
 i) wherein the sliding member moves the blade between inner and outer positions; and
 j) wherein the harvesting head has multiple fingers, at least a plurality of carrying blades, wherein the sliding member moves to the outer position, the fingers are moved to the open position.

2. The harvester of claim 1 wherein when the sliding member moves to the inner position, the fingers are moved to the closed position.

3. The harvester of claim 1 wherein there are at least three fingers.

4. The harvester of claim 1 wherein there are at least four fingers.

5. The harvester of claim 1 wherein there are at least six fingers.

6. The harvester of claim 1 wherein the fingers pivot when moving between open and closed positions.

7. The harvester of claim 1 wherein each finger has a proximal end pivotally attached to the frame and a distal end having a flange.

8. The apparatus of claim 1 wherein at least one of said modules has a ground engaging ring that displaces some of the lettuce leaves downwardly.

9. The lettuce harvester of claim 1 wherein the harvester modules are circumferentially spaced on the chassis.

* * * * *